US008033565B2

(12) United States Patent
Holroyd

(10) Patent No.: US 8,033,565 B2
(45) Date of Patent: Oct. 11, 2011

(54) TANDEM WHEEL SUSPENSION SYSTEMS

(75) Inventor: Carl Justin Holroyd, Shrewsbury (GB)

(73) Assignee: Oldbury UK Limited, Wolverhampton (GB)

( * ) Notice: Subject to any disclaimer, the term of this patent is extended or adjusted under 35 U.S.C. 154(b) by 404 days.

(21) Appl. No.: 11/721,747

(22) PCT Filed: Dec. 13, 2005

(86) PCT No.: PCT/GB2005/004780
§ 371 (c)(1),
(2), (4) Date: Jul. 30, 2009

(87) PCT Pub. No.: WO2006/064201
PCT Pub. Date: Jun. 22, 2006

(65) Prior Publication Data
US 2009/0295105 A1    Dec. 3, 2009

(30) Foreign Application Priority Data
Dec. 14, 2004  (GB) .................................. 0427302.5

(51) Int. Cl.
*B60G 5/01*   (2006.01)
*B60G 5/053*  (2006.01)
*B60G 3/12*   (2006.01)
*B62B 19/02*  (2006.01)

(52) U.S. Cl. ............ 280/676; 280/8; 280/680; 280/681; 280/686; 280/687; 280/124.116; 280/124.128

(58) Field of Classification Search .............. 280/8, 656, 280/676, 680, 681, 686, 687, 124.116, 124.128, 280/124.163, 124.17, 124.175, 6.154, 6.157, 280/5.504, 5.513
See application file for complete search history.

(56) References Cited

U.S. PATENT DOCUMENTS

| 1,907,321 | A | * | 5/1933 | Hilstrom | 280/9 |
| 2,612,387 | A | | 9/1952 | Ronning | |
| 2,943,865 | A | * | 7/1960 | Fite | 280/686 |
| 3,653,677 | A | | 4/1972 | Feser | |
| 3,743,044 | A | * | 7/1973 | Scheele | 180/24 |
| 3,762,487 | A | * | 10/1973 | Bilas | 180/24.09 |
| 4,167,270 | A | * | 9/1979 | LaPlaca | 280/8 |
| 4,230,341 | A | * | 10/1980 | Hart et al. | 280/124.128 |

(Continued)

FOREIGN PATENT DOCUMENTS

DE    29512152    6/1996

*Primary Examiner* — Eric Culbreth
*Assistant Examiner* — Joseph Rocca
(74) *Attorney, Agent, or Firm* — Larkin, Hoffman, Daly & Lindgren, Ltd.; Craig J. Lervick

(57) ABSTRACT

A trailer tandem wheel suspension system comprising a pair of suspension units (3) for mounting on either side of a chassis (4) of a trailer (1) to support a pair of wheels 2', 2" and arranged to respond both to small and large deflections of the wheels 2', 2". Each suspension unit (3) has a primary spring element (12) and a secondary spring element (13) linked to the primary spring element (12) so that the primary and secondary spring elements (12, 13) are effective over different ranges of movement of the wheels 2', 2". The primary spring element (12) is a leaf spring responsive to small movements of the wheels 2', 2" and the secondary spring element (13) includes a compression spring (18) linked to the leaf spring and responsive to larger movements of the wheels 2', 2".

16 Claims, 8 Drawing Sheets

U.S. PATENT DOCUMENTS

| | | | | |
|---|---|---|---|---|
| 5,249,821 A * | 10/1993 | Ricketts et al. | | 280/638 |
| 5,299,826 A * | 4/1994 | Flowers | | 280/651 |
| 6,131,919 A * | 10/2000 | Lee et al. | | 280/6.154 |
| 6,364,340 B1 * | 4/2002 | Taylor | | 280/676 |
| 6,454,283 B1 * | 9/2002 | Fenton | | 280/124.163 |
| 6,871,864 B2 * | 3/2005 | Reineck | | 280/124.107 |
| 2009/0127839 A1 * | 5/2009 | Long | | 280/757 |

* cited by examiner

TANDEM WHEEL SUSPENSION SYSTEMS

This invention concerns improvements in or relating to tandem wheel suspension systems. The invention has particular application to tandem wheel suspension systems for trailers, especially trailers suitable for use off-road.

Trailer suspension systems are known for use on a road surface, such as tarmac, where only small deflections of the wheels occur. These known suspension systems are generally unsuitable for use off-road where significantly larger displacements of the wheels can occur.

A further problem occurs if the surface across which the trailer travels is snow or sand. The wheels on the trailer can sink into and skid on the snow or sand surface making pulling the trailer difficult and hazardous.

A trailer pulled behind an off-road vehicle may have to pass through water, for example when crossing a river. This can be a problem where the trailer has a low bed and goods carried by the trailer can be damaged by contact with water.

It is an object of the invention is to provide a trailer suspension system that overcomes or at least mitigates some or all of the aforementioned problems.

A preferred object of the invention to provide a tandem wheel suspension system for a trailer that is suitable for use on and off-road.

A further preferred object of the invention is to provide a trailer suspension system that is suitable for use on snow or sand surfaces, especially off-road.

A yet further preferred object of the invention is to provide a trailer suitable for traversing water, especially a trailer having a low bed.

According to a first aspect of the invention there is provided a trailer tandem wheel suspension system comprising a pair of suspension units for mounting on either side of a chassis of a trailer, each suspension unit rotatably supporting a pair of wheels, a primary spring element, and a secondary spring element linked to the primary spring element, each spring element being responsive to a pre-determined movement of the wheels relative to the chassis.

The invention provides a trailer tandem wheel suspension system in which the primary spring element and secondary element can be arranged to absorb both small and large deflections of each wheel. In particular, the primary and secondary spring elements may be effective over different ranges of movement of the wheels such that the suspension system responds both to small and large deflections of the wheels. In this way, the suspension system is suitable for both on and off-road use of the trailer.

Preferably, the primary spring element is responsive to small movements of the wheels, typically of the order of 10 mm or below, and the secondary spring element is responsive to larger movements of the wheels. It will be understood however that the spring elements may be arranged to be responsive to other ranges of predetermined movement of the wheels.

Preferably, each suspension unit comprises a first suspension subset pivotally mounted to the chassis for supporting one of the wheels, a second suspension subset pivotally mounted to the chassis for supporting the other wheel, and each spring element is responsive to a predetermined pivotal movement of each suspension subset.

Preferably, the wheels are mounted on separate axles so as to move independently of the other wheels, and the primary and secondary spring elements interconnect the first and second suspension subsets and are responsive to relative movement of the subsets to maintain the chassis horizontal when the wheels move over an uneven surface.

In a preferred arrangement, the primary spring element is a leaf spring connected at the ends to the first and second suspension subsets and mounted on one of the subsets between the ends, and the secondary spring element comprises a meta-elastic hollow rubber spring connected to said one subset and the end of the leaf spring connected to the other subset. The hollow rubber spring supplements the conventional leaf spring responding effectively to deflections of the wheels larger than 10 mm.

Preferably, a telescopic damper extends from each suspension subset to the vehicle chassis. The dampers suppress pivotal movement of the suspension subsets to prevent/reduce oscillating movement of the subsets when the wheels are deflected.

The suspension system may comprise a sub-frame to which the suspension subsets are pivotally attached and the sub-frame is connectable to the chassis. Stops may be provided on the chassis or sub-frame to limit pivotal movement of the suspension subsets. In this way, the wheels do not contact the trailer bed when deflected.

According to a second aspect there is provided a trailer comprising a tandem wheel suspension system according to the first aspect of the invention.

Preferably, each suspension unit is mounted to the trailer such that wheels can move into a space outside or between cross members of the chassis. In this way, the wheels can be suspended just below the chassis, as movement of the wheels is not inhibited/prevented by the chassis. This allows the trailer bed to be positioned close to the ground.

According to a third aspect of the invention there is provided a kit of parts for forming a trailer tandem wheel suspension system according to the first aspect of the invention. The kit of parts may be used for adapting an existing trailer to incorporate the tandem wheel suspension system of the invention.

According to a fourth aspect of the invention there is provided a trailer comprising a suspension system connected to at least one ski or skid.

In this way, the trailer is suitable for use on sand or snow with the suspension system absorbing impacts and bumps protecting objects/equipment carried by the trailer.

The suspension system may be a tandem wheel suspension system according to the first aspect of the invention.

According to a fifth aspect of the invention there is provided a trailer comprising a chassis, a plurality of panels mounted to the chassis to form a fluid tight perimeter wall around a trailer bed with one or more of the panels movable for accessing the trailer bed.

In this way, the trailer can be partially submerged in water up to the height of the panels without water entering the trailer bed and the trailer bed can be easily accessed for loading and unloading by moving one or more of the panels.

One or more of the panels may be pivotally mounted to the chassis. Posts may be provided on the chassis between adjacent ends of the panels, the posts having sealing faces engaged by the panels to form the fluid tight perimeter wall.

Preferably, the trailer bed is rectangular in plan view and the perimeter wall comprises a front panel, a rear panel and two side panels. Preferably, the front panel is fixed in place on the chassis and the rear and side panels are pivotally mounted to the chassis. Sealing faces may be provided on the front panel and corner posts at the rear of the chassis, the sealing faces being engaged by the panels to form the fluid tight perimeter wall.

Embodiments of the invention will now be described, by way of example only, with reference to the accompanying drawings in which.

Figure 1:
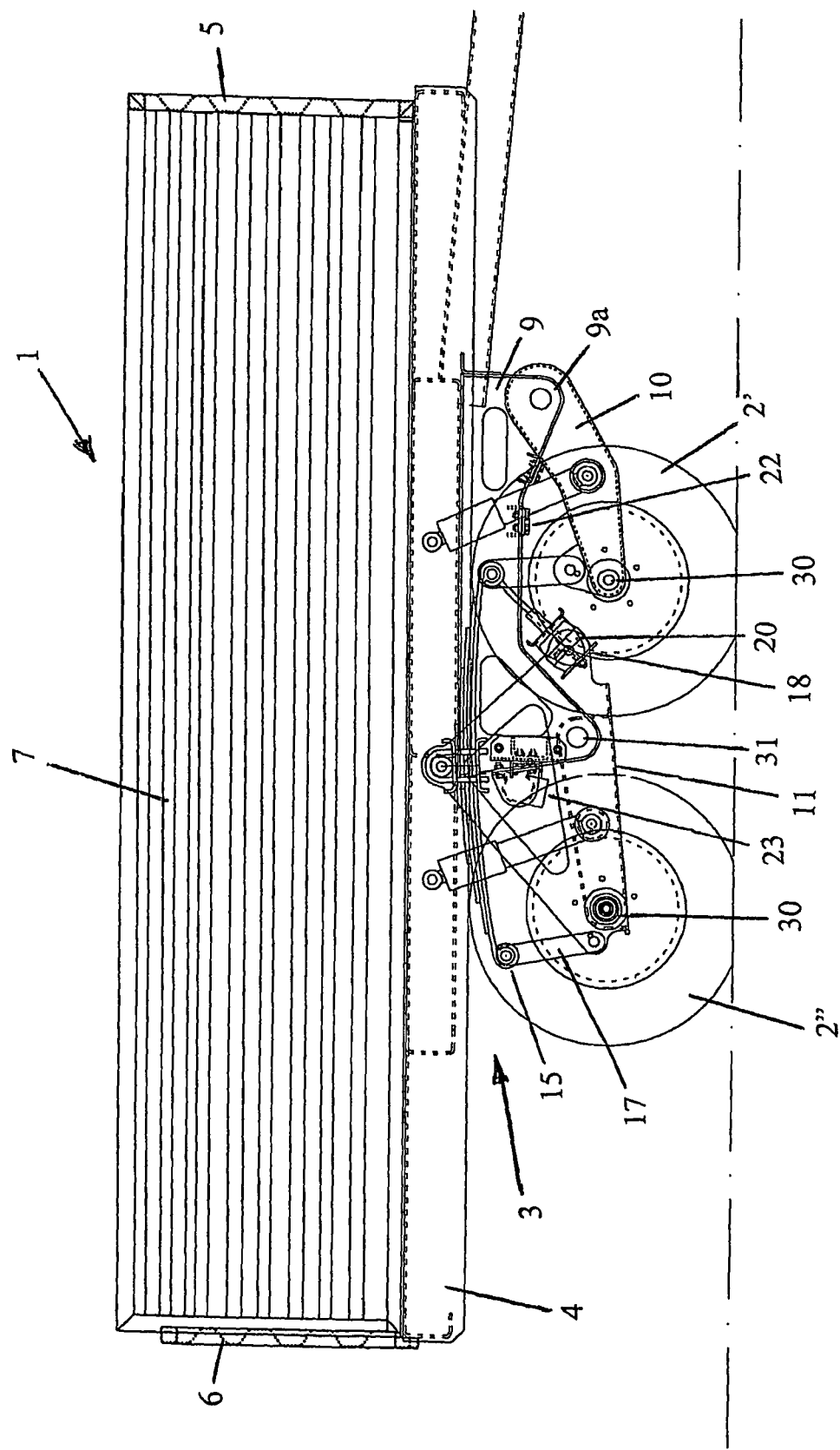
FIG. 1 shows a side view of an embodiment of a trailer according to the invention.

Referring now to FIGS. 1 to 4, there is shown a trailer 1 comprising a tandem suspension system for mounting a pair of wheels 2 on either side of a chassis 4 of the trailer 1. The wheels 2 on either side of the trailer 1 are mounted for rotation on separate axles 30. The trailer 1 further comprises fixed front panel 5, rear panel 6 and side panels 7, 8 that form a perimeter wall enclosing a trailer bed for holding loads, such as satellite tracking systems. Extending from the chassis 4 is a hitch 4a for attaching the trailer 1 to a vehicle.

The suspension system comprises two suspension units 3. Each suspension unit 3 comprises a support frame 9 bolted to the chassis 4, a first suspension subset for mounting front wheel 2', a second suspension subset for mounting rear wheel 2" and primary and secondary spring elements 12, 13 responsive to movement of the axles 30.

The first suspension subset includes a leading arm 10, a link member 16 connecting the arm 10 to the primary and secondary spring elements 12, 13 and a telescopic damper 19". The leading arm 10 is pivotally connected at one end to a lobe 9a at the front of the support frame 9 and connected at the other end to the axle 30 of front wheel 2'. The telescopic damper 19" extends from the arm 10 to the chassis 4.

The second suspension subset includes a trailing arm 11, a link member 17 connecting the arm 11 to the primary spring element 12 and a telescopic damper 19'. Trailing arm 11 is substantially triangular shaped having one corner attached to the axle 30 of rear wheel 2", another corner attached to the secondary spring element 13 and an apex attached to the primary spring element 12. The trailing arm 11 is pivotally connected to the support frame 9 at a pivot point 31 between the connections to the secondary spring element 13 and rear wheel axle 30. The telescopic damper 19' extends from the arm 11 to the chassis 4.

The primary spring element is a leaf spring 12 having a central region between opposed ends 14,15 attached to the apex of arm 11 by a clamp. Link members 16,17 pivotally connect respective arms 10,11 to one of the ends 14,15 of the primary spring element 12. In this way, the leaf spring 12 moves together with the trailing arm 11 and is responsive to movement of each wheel axle 30.

The secondary spring element 13 comprises a tension rod 21 and a hollow rubber compression spring 18. The spring element 13 links the corner of the trailing arm 11 to end 14 of the leaf spring 12. The compression spring 18 is responsive to large movement of the wheel axles 30, that is movement over 10 mm, to supplement the biasing of the primary leaf spring 12. Typically, the compression spring 18 is an Aeon™ hollow rubber compression spring having a bump load capacity of 3300 kgf. A secondary spring alignment yoke 20 marries the tension rod 21 to the spring 18.

Figure 2:
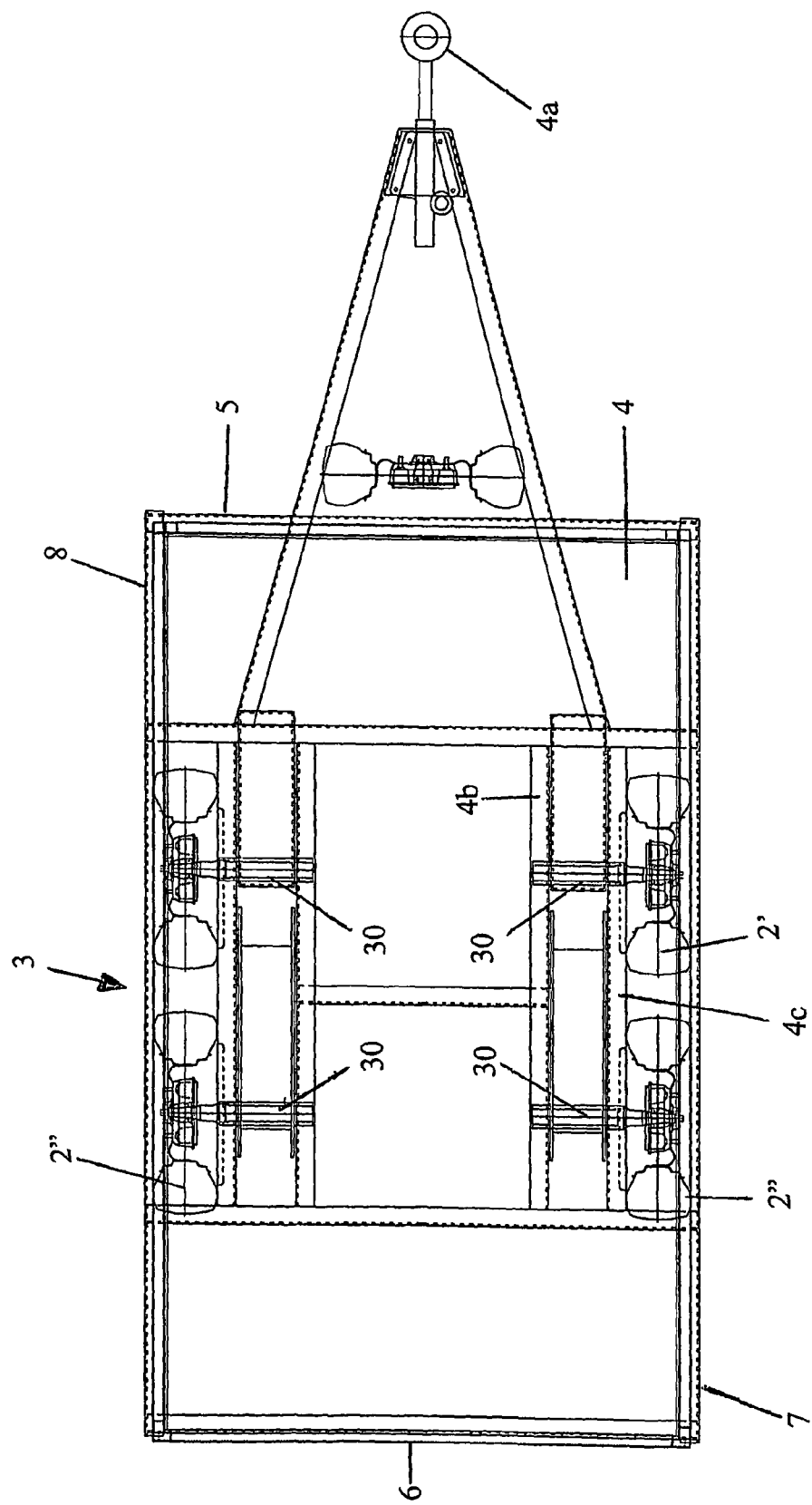
FIG. 2 shows a plan view of a chassis and suspension system of the trailer shown in FIG. 1.

As shown in FIG. 2, the suspension units 3 are attached to the chassis 4 between cross members 4b and 4c with the wheels 2 positioned outside cross member 4c such that the wheels 2" can move upwards into the space outside cross member 4c. Therefore, the wheels 2 can be suspended close to the chassis 4 without the chassis 4 interfering with movement of the wheels 2. Accordingly, the height of the trailer bed is reduced to provide a low loading trailer. Typically, the height of the trailer bed above the ground is 80 cm.

In use, the spring elements 12,13 bias the wheels 2 against the ground and, during the trailer's travel the wheels 2 may be deflected by bumps on the ground. Deflections of the wheels 2 result in pivotal movement of the arms 10,11 against the biasing of the spring elements 12,13 absorbing the impact of the bump. The primary spring element 12 responds effectively to small deflections of the arms 10,11, of the order of 10 mm or less, to produce a reaction forcing the wheels 2 towards the ground. Spring 18 does not produce a large reaction force for these small deflections and the biasing of the arms 10,11 is dominated by the leaf spring 12 for small deflections. However, the reaction force of spring 18 gradually increases as the load applied to the spring 18 increases with greater deflections of the arms 10,11. For large deflections, those over 10 mm, the biasing of the arms 10,11 is dominated by spring element 13. Accordingly, the suspension system 3 operates effectively both for small and large deflections of the wheels 2.

The telescopic dampers 19',19" reduce oscillating movement of the arms 10,11 when the arms 10,11 are deflected against the biasing of the springs 12,13.

Figure 3:
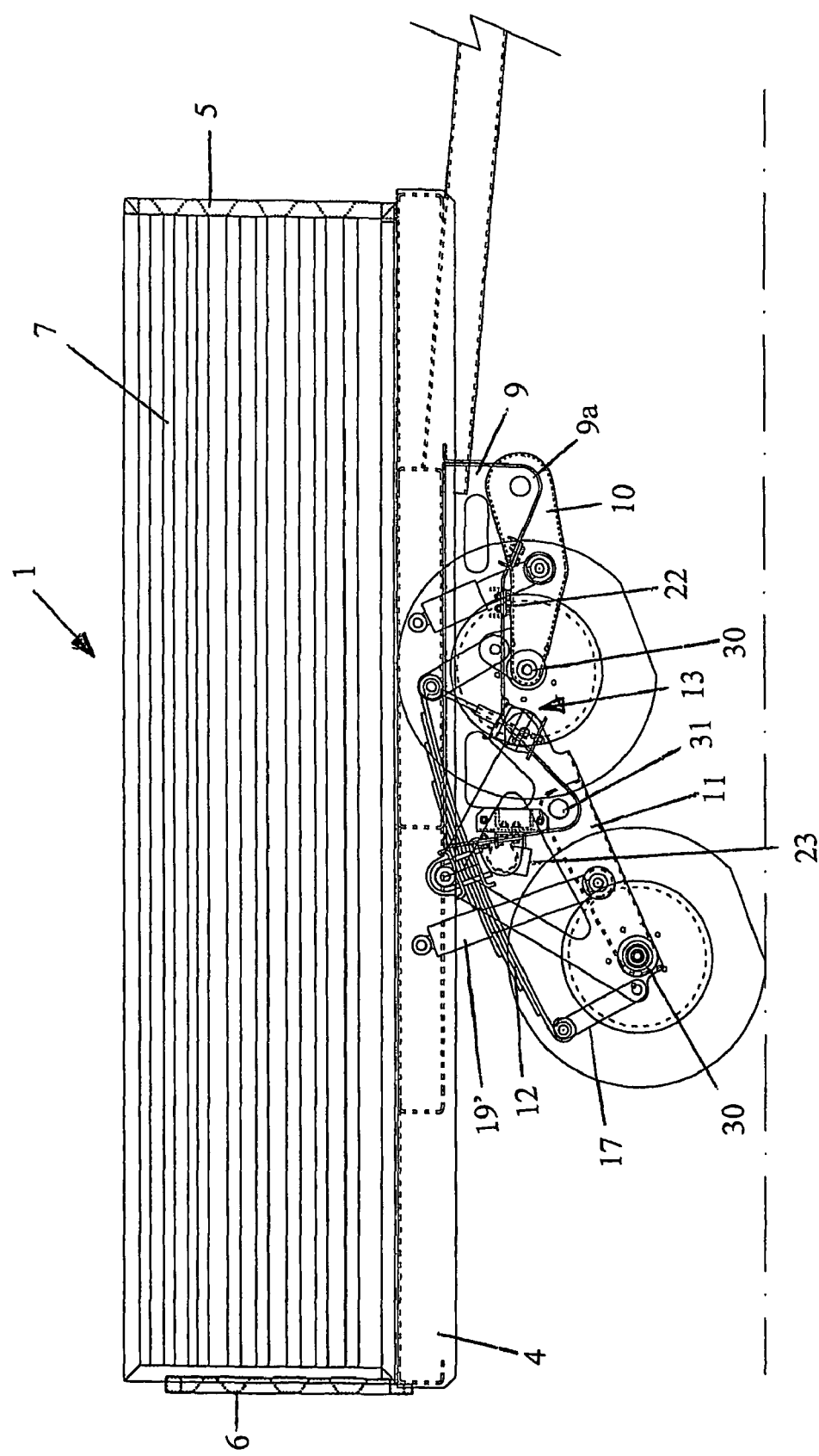
FIG. 3 shows a side view of the trailer shown in FIGS. 1 and 2 on a downward incline.
Figure 4:
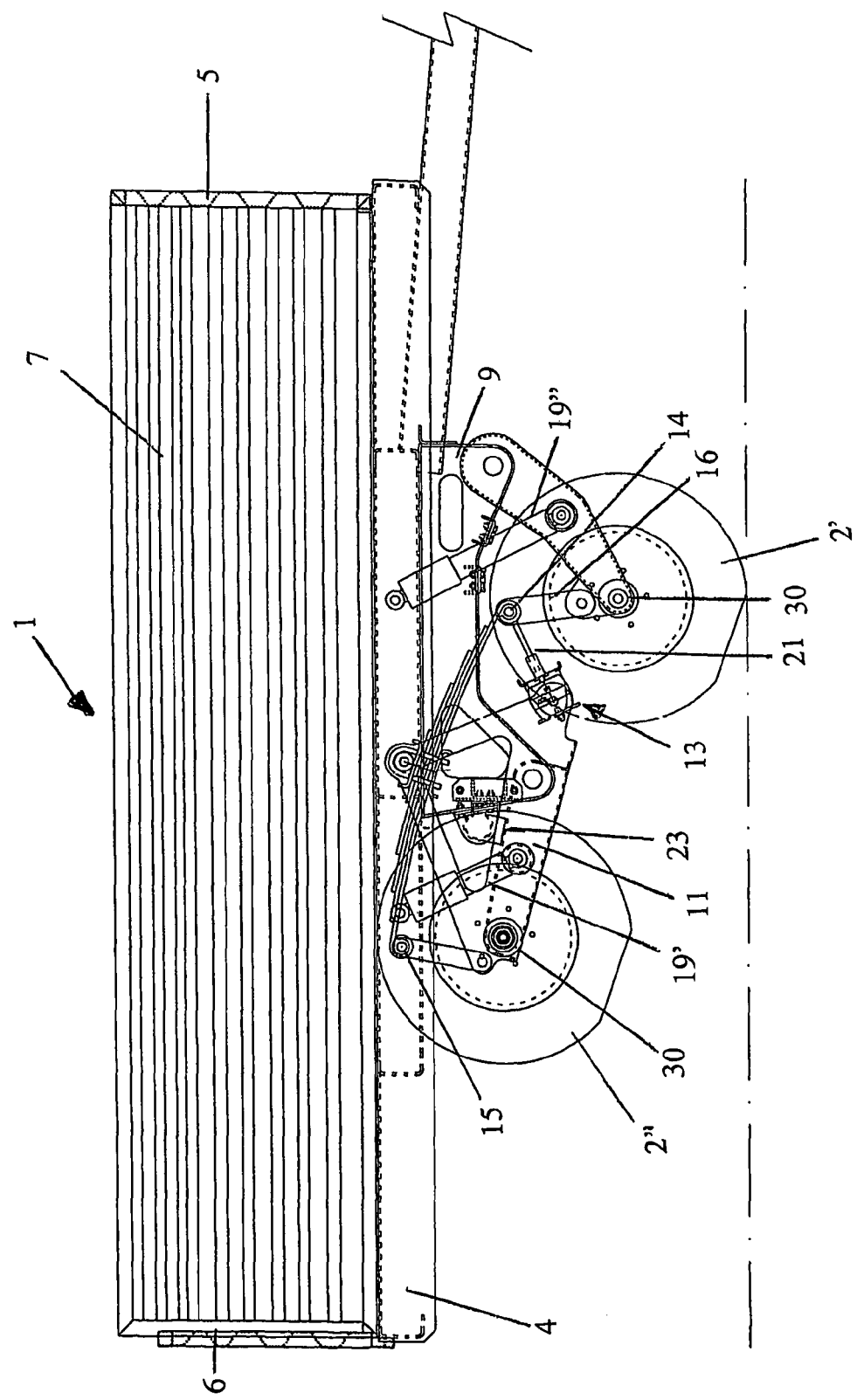
FIG. 4 shows a side view of the trailer shown in FIGS. 1 and 2 on an upward incline.
Figure 5:
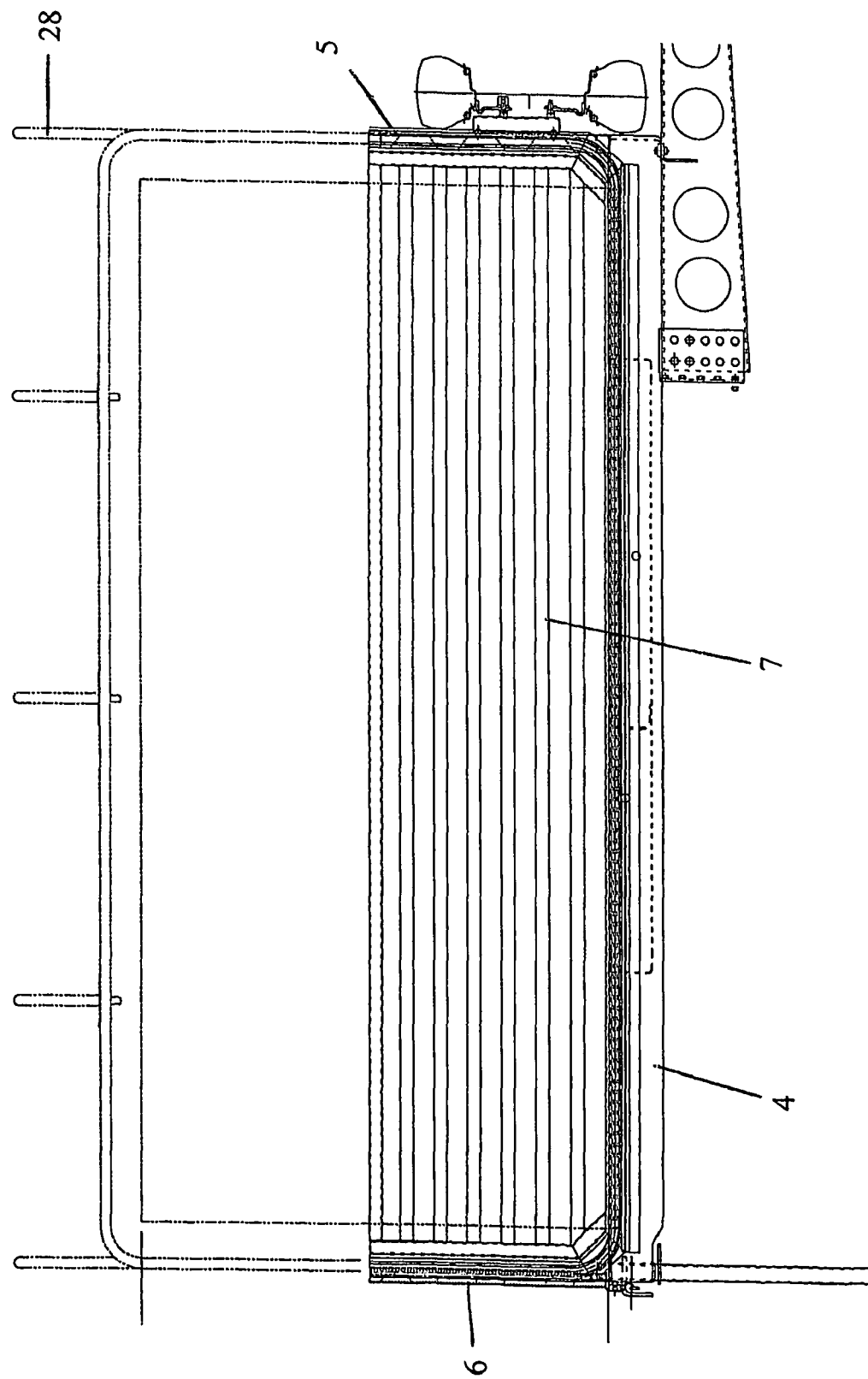
FIG. 5 shows a side view of a trailer having a canopy support.
Figure 6:
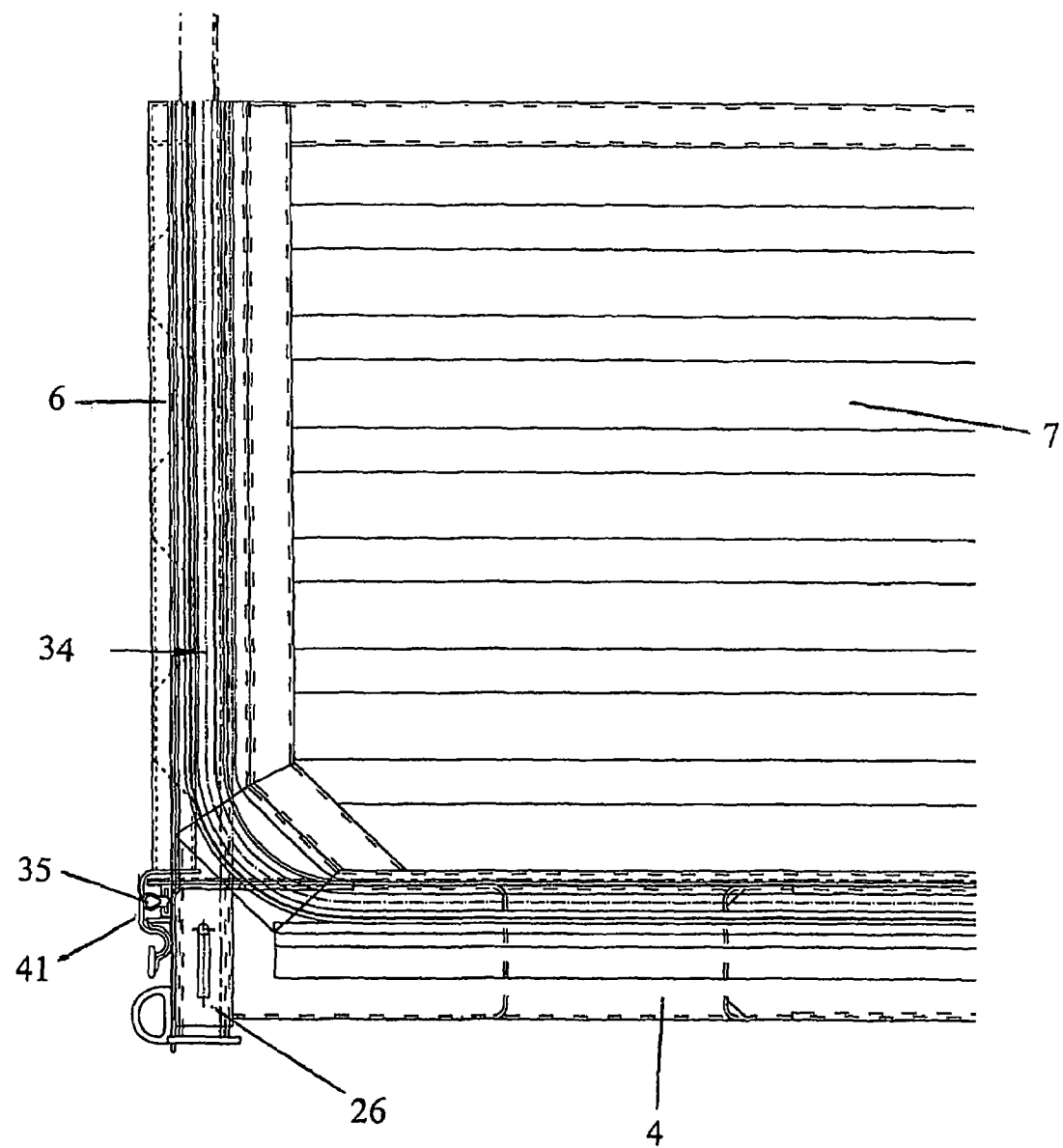
FIG. 6 shows a cross-sectional view of the trailer from the side.
Figure 7:
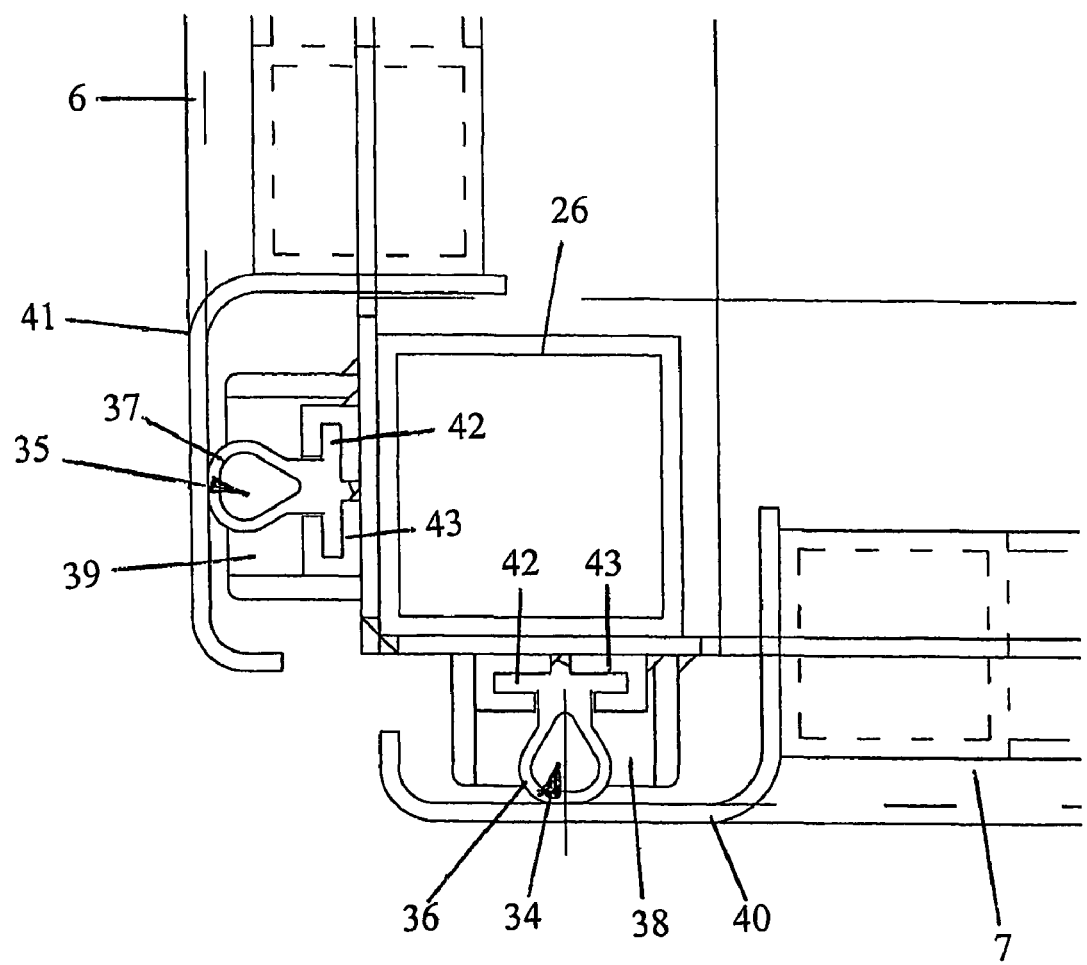
FIG. 7 shows an enlarged cross-sectional view of the trailer from above.
Figure 8:
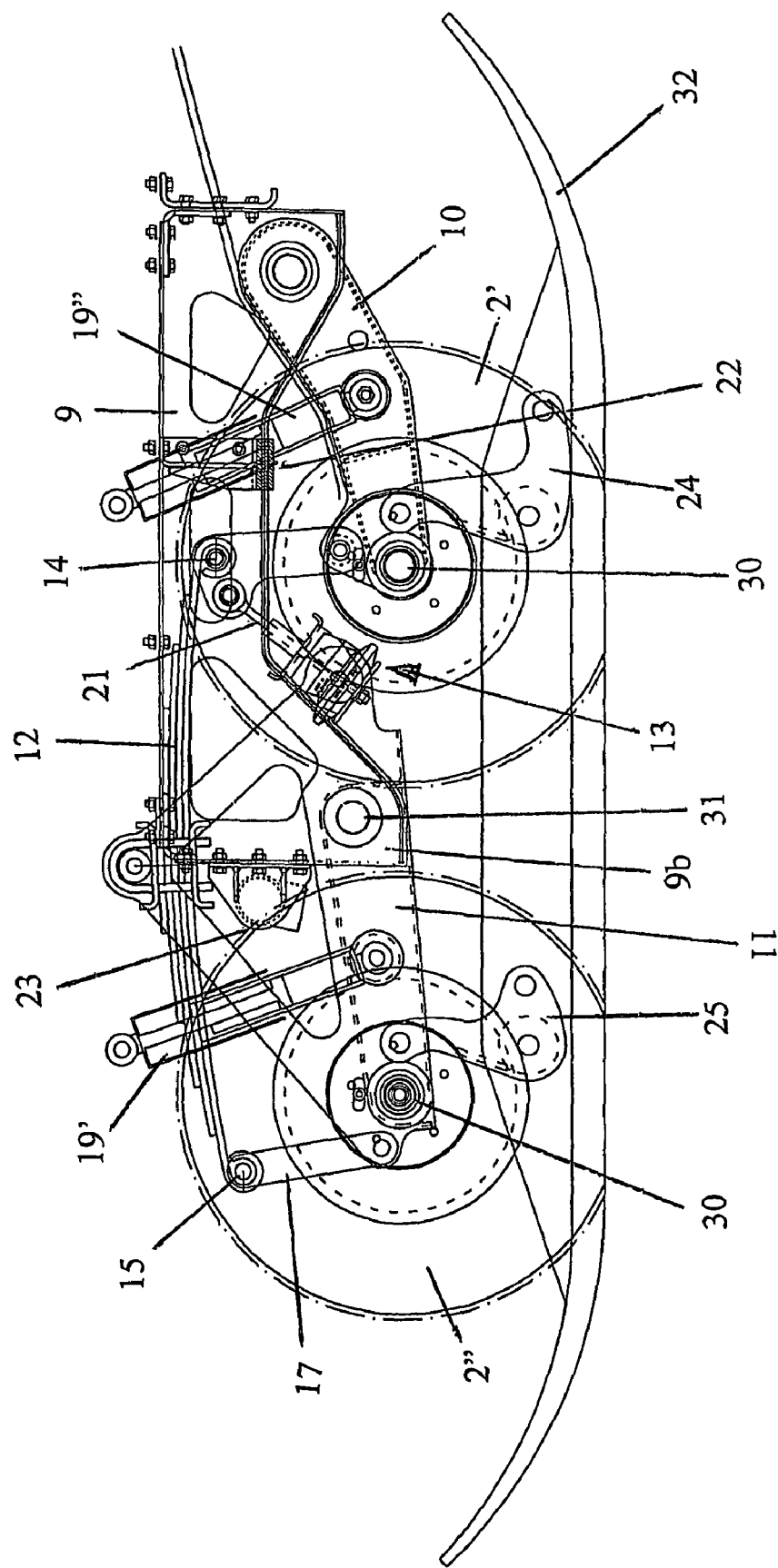
FIG. 8 shows a side view of the suspension system connected with a ski.

As shown in FIGS. 3 and 4, when the trailer 1 travels along an incline, the arms 10,11 pivot to orientate the wheels 2 relative to the incline. As primary spring element 12 and secondary spring element 13 are mounted on the suspension subsets, these spring elements 12,13 move together with suspension subsets to orientate themselves with the angle of the incline. The suspension system therefore orientates itself to the angle of the incline while the trailer bed is maintained horizontal.

Bump stops 22,23 are provided on the support frame 9. Bump stop 23 is engaged by trailing arm 11 when the trailer is on a downward incline of a steepness above 18.7°, as shown in FIG. 3, and bump stop 22 is engaged by leading arm 12 when the trailer is on an upward incline of a steepness above 20.98°, as shown in FIG. 4. It will be understood however that the bump stops may be arranged to limit pivotal movement of the leading and trailing arms 10,11 to other predetermined angles.

Rear panel 6 and side panels 7, 8 are pivotally mounted to the chassis 4 such that the panels 6, 7, 8 can be lowered for loading the trailer bed and raised to a closed position shown in FIGS. 1 to 7 for forming a perimeter wall around the trailer bed with fixed front panel 5. The trailer 1 is provided with fixed rear posts 26 at the corners of the trailer 1 where rear panel 6 and side panels 7,8 meet in the closed position. Seals 34,35 extend vertically along the rear posts 26 and marginal edges of the front panel 5 and horizontally along the chassis 4 to provide sealing faces contacted by the rear and side panels 6, 7 and 8 in the closed position. The seals 34,35 comprise hoop shaped elastomer members 36,37 that protrude from a channel 38,39. In the closed position, flanges 40,41 on the rear and side panels 6,7,8 contact and the elastomer member 36,37 on the rear posts 26 and front panel 5 to distort the elastomer member 36,37 forming a fluid tight seal around the trailer bed preventing the egress of water into the trailer bed.

The elastomer member 36,37 further comprises T-shaped ends 42 for insertion into complimentary shaped slots 43 provided on the rear posts 26 and front panel 5. In this way, the elastomer member 36,37 can be removed and replaced if the seal deteriorates over time.

A canopy support 28 is also provided for supporting a canopy to protect goods carried in the trailer bed from rain, sleet, snow etc.

As shown in FIG. 78, each suspension unit 3 can also be connected to a sk 32 via L-shaped brackets 24, 25. It may be desirable to use skis 32 instead of wheels 2 on off-road surfaces such as sand and snow. The skis 32 could be deployed without the wheels 2, however in a preferred embodiment the skis 32 are connected to the suspension system 3 together with the wheels 2, with the skis being retractable by pivotal movement of brackets 24, 25 when the skis are not required. In this way, the trailer can be quickly adaptable for use in different environments.

The skis 32 allow the trailer to travel across snow and sand while the suspension system absorbs deflections of the skis 22 caused by bumps on the surface.

The trailer is advantageous as it is suitable for use off-road. In particular, the suspension system 3 allows the trailer to move down and up inclines without tipping and can absorb both small and large deflections of the wheels 2 or skis 32. More especially, the system can deal with small deflections, typically up to 10 mm, by means of the primary spring element by itself and the secondary spring element is linked to the primary spring element to enable the system to deal with larger deflections which the primary spring element cannot deal with by itself. Furthermore, with skis 32 attached to the suspension system, the trailer can be easily pulled across snow or sand. The trailer also has a fluid tight trailer bed protecting goods carried therein from water. This can be particularly important when the trailer is carrying sensitive electronic equipment, such as satellite tracking systems.

It will be understood that modifications and alterations can be made to the described embodiments without departing from the invention. For example, the suspension system 3 is not limited to use with wheels or skis but can be used with caterpillar tracks, skids or the like. The use of skis with a suspension system is not limited to the suspension system described but includes other suspension systems that can be adapted for connection to skis.

It will be understood that for very large trailers the suspension system may comprise more than one pair of suspension units.

The invention claimed is:

1. A trailer tandem wheel suspension system comprising:
a pair of suspension units for mounting on either side of a chassis of a trailer, each suspension unit rotatably supporting a pair of wheels, wherein each suspension unit includes a first suspension subset pivotally mounted to the chassis for supporting one of the wheels, a second suspension subset pivotally mounted to the chassis for supporting the other wheel;
a primary spring element; and
a secondary spring element linked to the primary spring element, each spring element being responsive to a pre-determined movement of the wheels relative to the chassis and responsive to a predetermined pivotal movement of each suspension subset;
wherein the primary spring element is a leaf spring having a first end and a second end connected to the first and second suspension subsets, respectively, and mounted on one of the subsets between the first and second ends, and wherein the secondary spring element is a meta-elastic hollow rubber spring having one end connected to said one subset and having another end connected to one end of the leaf spring and the other subset.

2. The suspension system of claim 1 in which the primary spring element and secondary element are arranged to absorb both small and large deflections of each wheel.

3. The suspension system of claim 1 in which the primary and secondary spring elements are effective over different ranges of movement of the wheels such that the suspension system responds both to small and large deflections of the wheels.

4. The suspension system of claim 3 in which the primary spring element is responsive to movements of the wheels up to 10 mm and the secondary spring element is responsive to movements of the wheels above 10 mm.

5. The suspension system of claim 1 in which the wheels are mounted on separate axles so as to move independently of the other wheels.

6. The suspension system of claim 1 in which the primary and secondary spring elements interconnect the first and second suspension subsets and are responsive to relative movement of the subsets to maintain the chassis horizontal when the wheels move over an uneven surface.

7. The suspension system of claim 1 in which a telescopic damper extends from each suspension subset to the vehicle chassis.

8. The suspension system of claim 7 in which the dampers suppress pivotal movement of the suspension subsets to reduce oscillating movement of the subsets when the wheels are deflected.

9. The suspension system of claim 1 further comprising a sub-frame to which the suspension subsets are pivotally attached and the sub-frame is connectable to the chassis.

10. The suspension system according to claim 9 in which stops are provided on the chassis or sub-frame to limit pivotal movement of the suspension subsets.

11. A trailer comprising:
a chassis;
a pair of suspension units for mounting on either side of the chassis, each suspension unit including a first suspension subset mounting a first wheel for rotation about a first axle, a second suspension subset mounting a second wheel for rotation about a second axle separate from the first axle;
a primary spring element;
a secondary spring element being linked to the primary spring element, the primary and secondary spring elements being responsive to movement of the axles, wherein the primary spring element is primarily responsive to movement of the wheels relative to the chassis up to a pre-determined limit and the secondary spring element is primarily responsive to movement of the wheels relative to the chassis above the pre-determined limit; and
a trailer bed on the chassis wherein, when negotiating an incline, each suspension unit is configured to orientate the associated wheels relative to the incline such that the trailer bed is maintained horizontal.

12. The trailer of claim 11 in which the wheels are suspended just below the chassis and each suspension unit is mounted to the trailer such that wheels can move into a space outside or between cross members of the chassis.

13. The trailer of claim 11 in which the trailer comprises a plurality of panels mounted to the chassis to form a fluid tight perimeter wall around the trailer bed with one or more of the panels movable for accessing the trailer bed.

14. The trailer of claim 13 in which the trailer bed is rectangular in plan view and the perimeter wall comprises a front panel, a rear panel and two side panels, in which the front panel is fixed in place on the chassis and the rear and side panels are pivotally mounted to the chassis.

15. The trailer according to claim 11 in which each suspension unit is configured such that the wheels are suspended just below the chassis and the wheels can move into a space outside or between cross members of the chassis.

16. The trailer according to claim 11 in which each suspension unit includes a detachable ski.

* * * * *